(12) United States Patent
Pope et al.

(10) Patent No.: US 9,246,214 B2
(45) Date of Patent: Jan. 26, 2016

(54) ELECTRONIC DEVICE ANTENNA STRUCTURES WITH FERRITE LAYERS

(75) Inventors: Benjamin J. Pope, Sunnyvale, CA (US); Scott A. Myers, San Francisco, CA (US); Mattia Pascolini, Campbell, CA (US)

(73) Assignee: Apple Inc., Cupertino, CA (US)

( * ) Notice: Subject to any disclaimer, the term of this patent is extended or adjusted under 35 U.S.C. 154(b) by 189 days.

(21) Appl. No.: 13/415,830

(22) Filed: Mar. 8, 2012

(65) Prior Publication Data

US 2013/0234899 A1  Sep. 12, 2013

(51) Int. Cl.
*H01Q 1/24* (2006.01)
*H01Q 1/52* (2006.01)
*H01Q 7/06* (2006.01)

(52) U.S. Cl.
CPC .............. *H01Q 1/243* (2013.01); *H01Q 1/526* (2013.01); *H01Q 7/06* (2013.01); *Y10T 29/49016* (2015.01)

(58) Field of Classification Search
CPC .......... H01Q 1/243; H01Q 1/526; H01Q 7/06
USPC ........................ 343/702, 741, 787, 866, 872
See application file for complete search history.

(56) References Cited

U.S. PATENT DOCUMENTS

| | | | | |
|---|---|---|---|---|
| 7,315,248 B2* | 1/2008 | Egbert | | 340/572.7 |
| 7,684,781 B2* | 3/2010 | Saito et al. | | 455/333 |
| 7,775,446 B2* | 8/2010 | Ochi et al. | | 235/492 |
| 7,973,722 B1* | 7/2011 | Hill et al. | | 343/702 |
| 2004/0189459 A1* | 9/2004 | Sills et al. | | 340/487 |
| 2004/0203185 A1* | 10/2004 | Kerr et al. | | 438/106 |
| 2006/0262030 A1 | 11/2006 | Bae | | |
| 2008/0303735 A1* | 12/2008 | Fujimoto et al. | | 343/787 |
| 2011/0068178 A1* | 3/2011 | Gebhart | | 235/492 |
| 2011/0227799 A1* | 9/2011 | Hashimoto | | 343/702 |
| 2011/0279333 A1* | 11/2011 | Hong et al. | | 343/702 |
| 2012/0055013 A1 | 3/2012 | Finn | | |
| 2012/0062435 A1 | 3/2012 | Kato | | |
| 2012/0153029 A1* | 6/2012 | Kato | | 235/492 |
| 2012/0262348 A1* | 10/2012 | Kubo et al. | | 343/702 |
| 2013/0009826 A1* | 1/2013 | Wu | | 343/702 |

FOREIGN PATENT DOCUMENTS

WO    WO2011077878 A1 *  6/2011   ............... H01Q 7/06

OTHER PUBLICATIONS

Guo-Min Yang et al., Planar Annular Ring Antennas With Multilayer Self-biased Nico-Ferrite Films Loading, IEEE Transactions on Antennas and Propagation, Mar. 2010, 648, vol. 58, No. 3.

* cited by examiner

*Primary Examiner* — Robert Karacsony
*Assistant Examiner* — Daniel J Munoz
(74) *Attorney, Agent, or Firm* — Treyz Law Group; G. Victor Treyz; Michael H. Lyons

(57) ABSTRACT

Electronic devices may be provided that have antenna traces. The antenna traces may be configured to form an inductive loop that serves as a near field communications antenna. A layer of ferrite may be provided to reduce interference between the antenna and internal device components. The layer of ferrite and the antenna traces may be deposited on a common substrate such as a layer of polymer or a dielectric electronic device housing. A protective layer of polymer may be used to form a coating on the layer of ferrite. Ferrite may be formed on the same side of a substrate as the antenna traces or may be formed on an opposing side of the substrate.

10 Claims, 19 Drawing Sheets

ELECTRONIC DEVICE ANTENNA STRUCTURES WITH FERRITE LAYERS

BACKGROUND

This relates generally to electronic devices, and more particularly, to antennas for electronic devices.

Electronic devices such as portable computers and cellular telephones are often provided with wireless communications capabilities. For example, electronic devices may include cellular telephone circuitry and wireless local area network circuitry. Electronic devices may also be provided with circuitry for supporting near field communications (NFC).

It is often desirable to place a layer of ferrite material between a near field communications antenna and internal device components to reduce interference. This is typically done by laminating a layer of polymer ferrite film to a flexible printed circuit antenna using a layer of adhesive. Ferrite films are also available that use ceramic ferrites sandwiched between a carrier film and a protective film. The ceramic ferrites may be scored in a cross-hatch pattern to promote flexibility.

Using adhesive to attach a ferrite film to a flexible printed circuit antenna structure can add undesired thickness to an electronic device. Lamination techniques may also impose undesired process complexity during device fabrication.

It would therefore be desirable to be able to provide improved antenna structures with ferrite layers for electronic devices.

SUMMARY

Electronic devices may be provided that contain wireless communications circuitry. The wireless communications circuitry may include radio-frequency transceiver circuitry and antennas. For example, the wireless communications circuitry may include one or more near field communications antennas.

An electronic device may be provided with antenna traces that are configured to form an inductive loop that serves as a near field communications antenna. A layer of ferrite may be provided to reduce interference between the antenna and internal device components. The layer of ferrite may be interposed between the near field communications antenna and the internal device components. A layer of adhesive may be used to mount the near field antenna to an inner surface of an electronic device housing. Adhesive need not be used to laminate the ferrite layer to other antenna structures. Rather, the layer of ferrite and the antenna traces may be deposited on a common substrate such as a layer of polymer or may be formed together on a structure such as a dielectric electronic device housing wall.

The layer of ferrite may be formed from a ceramic ferrite or a polymer ferrite material. A protective layer of polymer may be used to form a coating over the layer of ferrite. Ferrite may be formed on the same side of a substrate as the antenna traces or may be formed on an opposing side of the substrate. Antenna traces may be patterned using laser direct structuring and other patterning techniques.

Further features of the invention, its nature and various advantages will be more apparent from the accompanying drawings and the following detailed description of the preferred embodiments.

DETAILED DESCRIPTION

Figure 1:
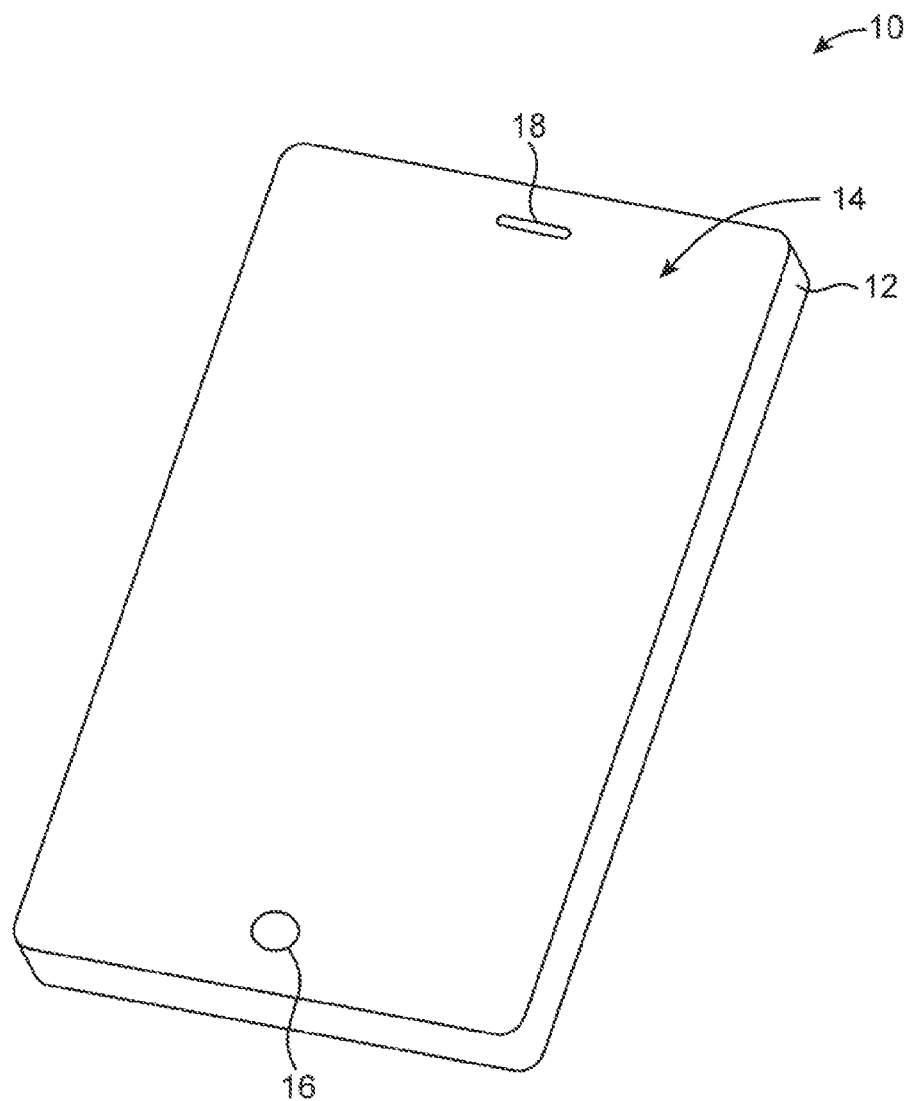
FIG. 1 is a perspective view of an illustrative electronic device with antenna and ferrite structures in accordance with an embodiment of the present invention.

Electronic devices such as electronic device 10 of FIG. 1 may be provided with wireless communications circuitry. The wireless communications circuitry may include one or more antennas. The antennas may include one or more near field communications antennas. As an example, an inductively coupled near field communications antenna may be formed from an inductor structure. The inductor structure may be formed from one or more loops of conductive material. The inductor structure for the near field communications antenna may, for example, be formed from one or more loops of metal traces.

A near field antenna of this type may produce electromagnetic fields. To reduce interference between these electromagnetic fields and internal device components, a layer of ferrite material may be interposed between the near field antenna and internal device components.

Electronic device 10 may be a portable electronic device or other suitable electronic device. For example, electronic device 10 may be a laptop computer, a tablet computer, a somewhat smaller device such as a wrist-watch device, pendant device, headphone device, earpiece device, or other wearable or miniature device, a cellular telephone, or a media player. Device 10 may also be a television, a set-top box, a desktop computer, a computer monitor into which a computer has been integrated, or other suitable electronic equipment.

Device 10 may have a display such as display 14 that is mounted in a housing such as housing 12. Display 14 may be a touch screen that incorporates a touch sensor or may be a display that is insensitive to touch. A touch sensor for display 14 may be formed from capacitive touch sensor electrodes, a resistive touch array, touch sensor structures based on acoustic touch, optical touch, or force-based touch technologies, or other suitable touch sensors.

Display 14 may include image pixels formed from light-emitting diodes (LEDs), organic LEDs (OLEDs), plasma cells, electrowetting pixels, electrophoretic pixels, liquid crystal display (LCD) components, or other suitable image pixel structures. A cover layer may cover the surface of display 14. The cover layer may be formed from a transparent glass layer, a clear plastic layer, or other transparent member. As shown in FIG. 1, openings may be formed in the cover layer to accommodate components such as button 16 and speaker port 18.

Housing 12, which may sometimes be referred to as a case, may be formed of plastic, glass, ceramics, fiber composites, metal (e.g., stainless steel, aluminum, etc.), other suitable materials, or a combination of these materials. In some situations, housing 12 or parts of housing 12 may be formed from dielectric or other low-conductivity material. In other situations, housing 12 or at least some of the structures that make up housing 12 may be formed from metal elements.

In configurations for device 10 in which housing 12 has dielectric portions such as a rear housing surface or other housing wall formed from plastic, glass, or other dielectric material, near field antenna structures may be mounted adjacent to the dielectric portions of the housing. Electromagnetic signals that are transmitted by and received by the near field antenna structures may pass through the dielectric housing portions.

Figure 2:
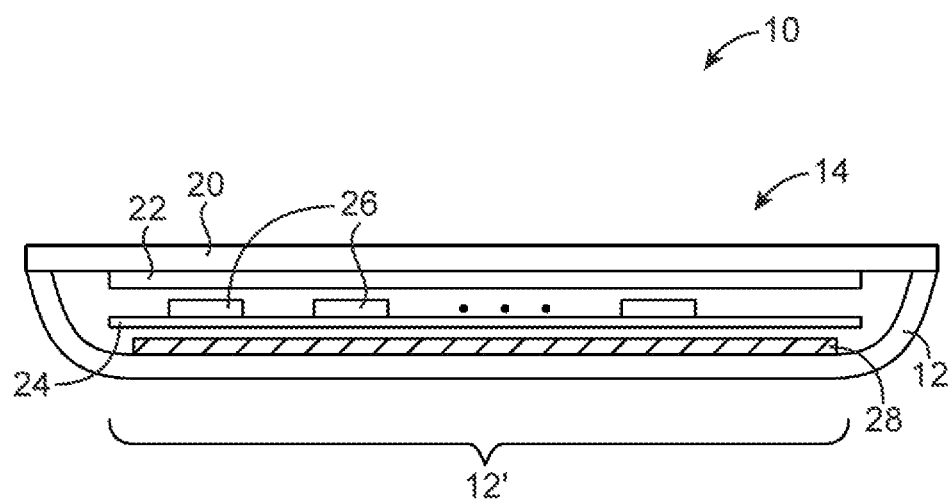
FIG. 2 is a cross-sectional side view of an illustrative electronic device having antenna and ferrite structures in accordance with an embodiment of the present invention.

A cross-sectional side view of device 10 is shown in FIG. 2. As shown in FIG. 2, device 10 may have a display cover layer such as display cover layer 20 that is mounted in housing 12. Display cover layer 20 may be formed from a layer of transparent glass or plastic (as examples). Display module 22 may be mounted under display cover layer 20.

Housing 12 may have a rear portion such as rear portion 12'. Antenna structures 28 may be mounted on the interior surface of rear portion 12' of housing 12 or elsewhere in housing 12. To ensure that electromagnetic signals associated with antenna structures 28 may pass through housing 12, housing portion 12' may be formed from a dielectric such as plastic, glass, ceramic, or other dielectric material. In the example of FIG. 2, region 12' of housing 12 and antenna structures 28 cover substantially all of the rear surface of device 10. This is, however, merely illustrative. Antenna structures 28 may be mounted on a smaller portion of the rear surface of housing 12 or in other locations within device 10 if desired.

Device 10 may include internal components such as components 26. Components 26 may be mounted on one or more substrates such as substrate 24. Components 26 may include wireless circuitry such as near field communications transceiver circuitry operating at 13.56 MHz or other suitable wireless circuitry, processor integrated circuits, switches, connectors, application-specific integrated circuits, and other circuitry.

Substrate 24 may be formed from plastic or may be implemented using one or more printed circuits. For example, substrate 24 may be a flexible printed circuit ("flex circuit") formed from a flexible sheet of polyimide or other polymer layer or may be a rigid printed circuit board (e.g., a printed circuit board formed from fiberglass-filled epoxy). Substrate 24 may include conductive interconnect paths such as one or more layers of patterned metal traces for routing signals between components 26 and antenna structures 28. If desired, transmission line structures such as coaxial cables, flexible printed circuit cables, traces on rigid printed circuit boards, and other transmission line structures may be used in interconnecting wireless circuitry in components 26 with antenna structures 28. As an example, a transmission line structure may be used to couple a near field communications (NFC) transceiver circuit in components 26 to antenna structures 28.

Figure 3:
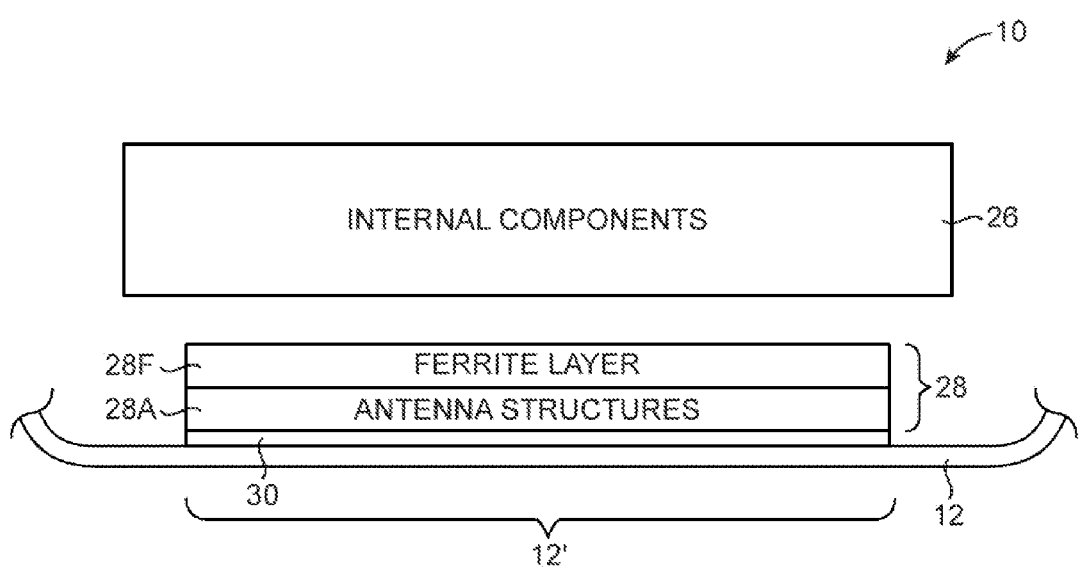
FIG. 3 is a cross-sectional side view of a portion of an electronic device showing how the device may be provided with antenna and ferrite structures in accordance with an embodiment of the present invention.

A cross-sectional side view of a portion of device 10 showing how antenna structures 28 may be mounted in device 10 between housing 12 and internal components 26 is shown in FIG. 3. During operation, radio-frequency electromagnetic signals such as wireless signals associated with near field communications or other wireless communications may pass through housing 12 (e.g., dielectric portion 12' of housing 12). Structures 28 may include a layer of ferrite material such as ferrite layer 28F and a layer of antenna structures such as antenna structures 28A. Antenna structures 28A may be used to transmit and receive wireless signals such as near field communications signals. Ferrite layer 28F may help shield internal components 26 from exposure to these signals during operation of device 10.

Antenna structures 28A may include metal antenna traces on a substrate. Ferrite layer 28F may be formed on the substrate without using any adhesive layers (i.e., without using adhesive interposed between ferrite layer 28F and the substrate for structures 28A), thereby helping to minimize the thickness of structures 28.

Ferrite layer 28F may be formed from ferrite material in a polymer binder (sometimes referred to as polymer ferrite), a ceramic ferrite material (sometimes referred to as a ceramic ferrite), or other suitable ferrite materials. The polymer material that is used as a binder in a polymer ferrite may provide sufficient structural support to allow the polymer ferrite to be formed in a layer without requiring a film backing. Ceramic ferrite structures may be formed on a substrate such as a polymer film substrate. Protective polymer films may be provided on ferrite layer 28F to help prevent ferrite layer 28F from becoming damaged during assembly.

Antenna structures 28A may be formed from conductive materials such as metals. As an example, antenna structures 28A may be formed from metal traces that have been patterned into the shape of an inductor for supporting inductively coupled near field communications. Patterned metal traces for antenna structures. 28A may be formed on a dielectric support structure such as part of housing 12, a polymer film, a plastic carrier, a rigid printed circuit board, or other suitable substrate. As shown in FIG. 3, antenna structures 28 may be mounted to housing 12 using adhesive layer 30.

Figure 4:
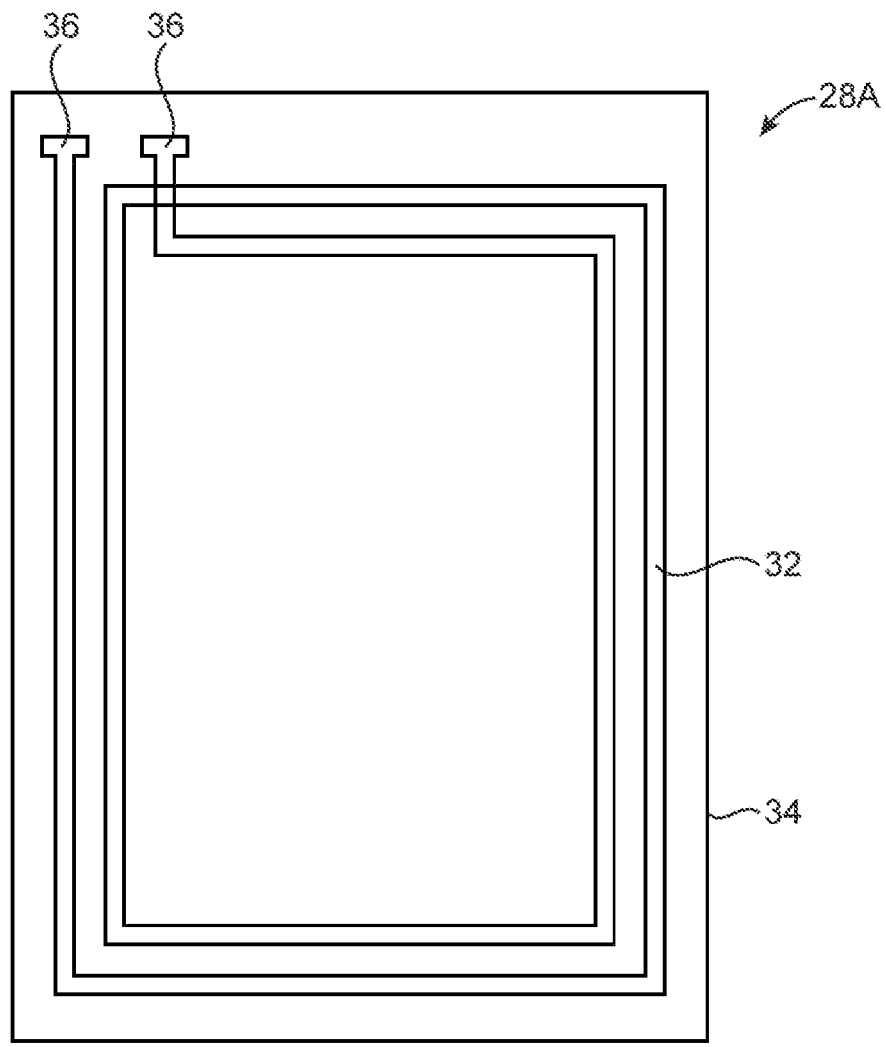
FIG. 4 is a diagram of an illustrative near field communications antenna of the type that may be formed from one or more loops of conductive material in accordance with an embodiment of the present invention.

A top view of antenna structures 28A showing an illustrative layout that may be used for conductive antenna traces 32 is shown in FIG. 4. As shown in FIG. 4, traces 32 may form one or more loops of conductive lines for forming an inductive near field communications antenna. In the example of FIG. 4, the antenna has two loops of conductive lines. This is merely illustrative. An antenna formed from traces 32 may have a single loop, a double loop, or may have three or more loops of conductive lines (e.g., 1-10 loops, more than 5 loops, 5-10 loops, fewer than 10 loops, etc.).

Traces 32 may have terminals such as terminals 36. Terminals 36 may sometimes be referred to as antenna feed terminals and may be coupled to near field communications transceiver circuitry or other wireless transceiver circuitry in components 26 (FIG. 2) using a transmission line. Antenna traces 32 may be formed on a dielectric layer such as illustrative substrate layer 34. Substrate layer 34 may be formed from a portion of housing 12, a flexible polymer layer, a plastic carrier, or other dielectric structures. Polymer layers for forming substrates and/or optional protective coating layers in antenna structures 28 may be formed from layers of polyimide, polyethylene terephthalate (PET), or other polymers.

Figure 5:
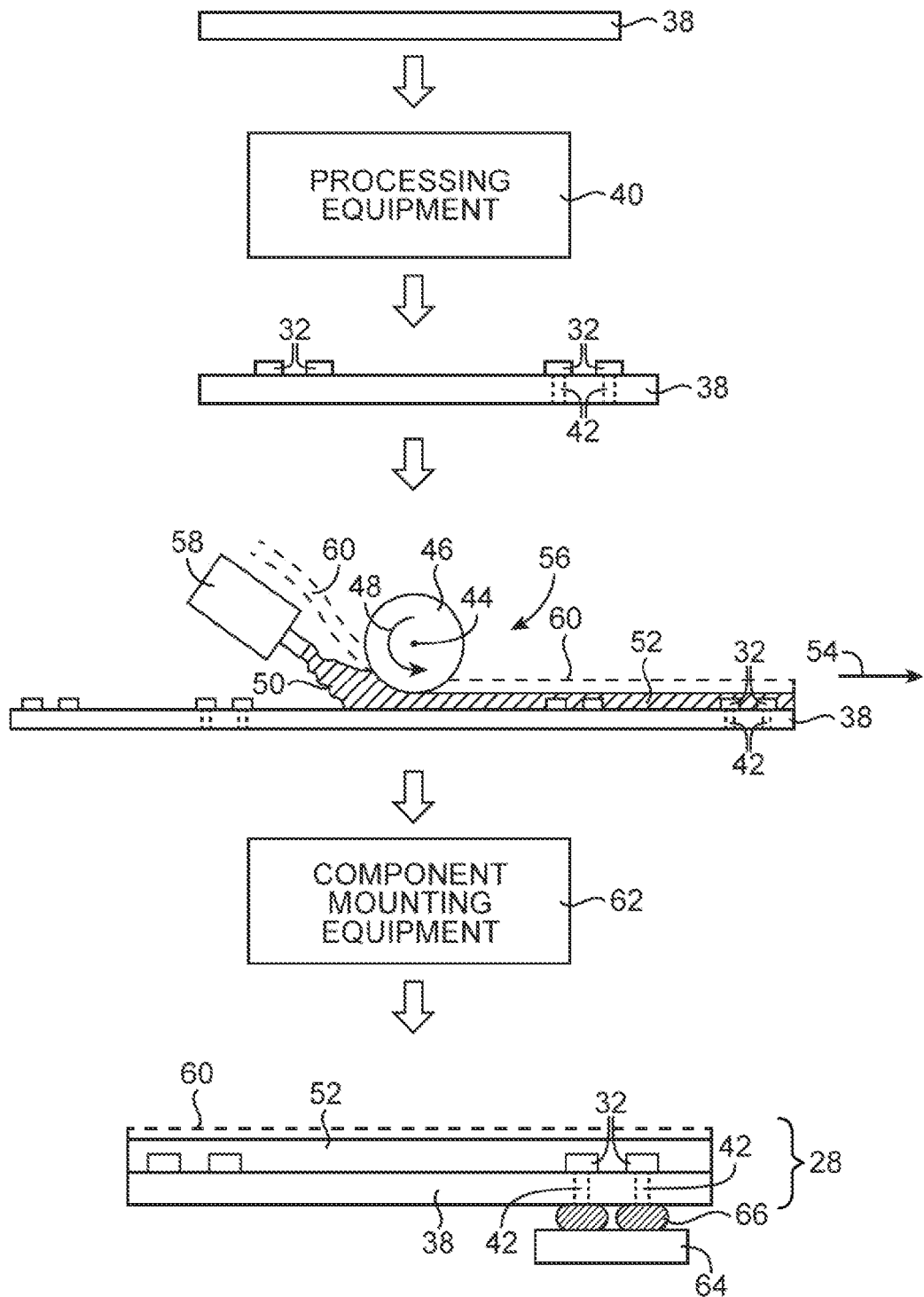
FIG. 5 is a diagram showing how antenna and ferrite structures may be provided by depositing polymer ferrite material on a printed circuit with antenna traces in accordance with an embodiment of the present invention.

FIG. 5 is a diagram showing how antenna structures such as antenna structures 28 of FIG. 3 may be formed by depositing ferrite material onto a substrate containing antenna traces for antenna structures 28A.

Initially, processing equipment 40 may be used to form antenna traces 32 on substrate 38. Substrate 38 may be a flexible sheet of polymer. Processing equipment 40 may include equipment for depositing and patterning metal traces 32. Processing equipment 40 may, for example, include equipment for deposing and patterning metal traces 32 using screen printing, ink-jet printing, spraying, physical vapor deposition, chemical vapor deposition, photolithography, electroplating, pad printing, or other suitable metal deposition and patterning equipment. If desired, equipment 40 may include etching equipment or other equipment for forming vias such as vias 42. Vias 42 may be used in forming backside contacts to traces 32 (e.g., to form backside contacts for antenna feed terminals in traces 32 such as antenna feed terminals 36 of FIG. 4).

Following the formation of patterned antenna traces 32 on substrate 38, ferrite deposition equipment 56 may be used to deposit a ferrite layer such as ferrite layer 52. Ferrite deposition equipment 56 may include roller-based deposition equipment or other suitable deposition equipment.

Ferrite layer 52 of FIG. 5 may be, for example, a polymer ferrite layer. Ferrite layer 52 may be deposited on top of traces 32 and substrate 38 using a continuous roller deposition process or other suitable deposition process to form antenna structures 28. By forming ferrite layer 52 on traces 32 and substrate 38, the need for using adhesive-based lamination processes to attach a separate sheet of ferrite material to traces 32 and substrate 38 may be avoided.

As shown in FIG. 5, equipment 56 may include roller 46 and ferrite material dispensing tool 58. Roller 46 may be rotated in direction 48 about rotation axis 44 as substrate 38 moves in direction 54. As roller 46 is rotated, liquid polymer ferrite material 50 may be dispensed by dispensing tool 58. Roller 46 may thin the dispensed polymer ferrite material to form polymer ferrite layer 52 on antenna traces 32 and on polymer layer 38. If desired, an optional protective layer such as optional protective polymer layer 60 may be deposited on top of polymer ferrite layer 52 (e.g., by using roller 46 or other deposition equipment to attach a polymer sheet or to otherwise form a polymer layer on layer 52). If vias 42 were not formed before formation of layer 52, equipment such as equipment 40 (e.g., via etching equipment) may be used to form vias 42 following formation of layer 52 and optional layer 60.

Component mounting equipment 62 may be used to attach one or more components such as components 64 to antenna structures 28. Components 64 may be mounted to backside contacts on substrate 38 formed using vias 42. Components 64 may include a connector (e.g., a connector for coupling a transmission line to antenna traces 32), a part of a flexible printed circuit cable (e.g., part of a flexible printed circuit cable containing a transmission line for coupling to traces 32), one or more integrated circuits (e.g., transceiver circuitry), discrete circuit components, or other components. Components 64 may be mounted to backside contacts formed using vias 42 by solder 66. Component mounting equipment 62 may include equipment for forming solder connections 66 (e.g., a reflow oven, pick and place equipment for mounting components, hot-bar equipment for soldering, etc.).

Figure 6:
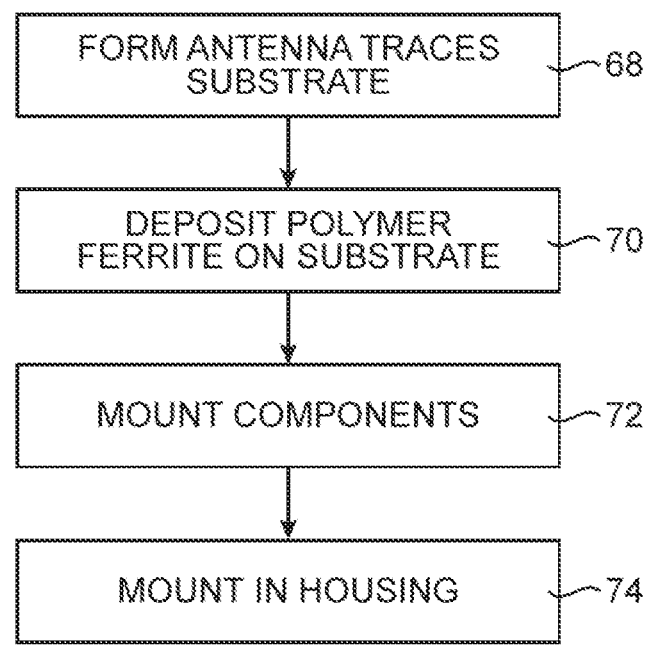
FIG. 6 is a flow chart of illustrative steps involved in forming antenna and ferrite structures of the type shown in FIG. 5 in accordance with an embodiment of the present invention.

Illustrative steps involved in forming antenna structures 28 using an approach of the type shown in FIG. 5 are shown in FIG. 6.

At step 68, processing equipment 40 may be used to form patterned antenna traces 32 on a polymer film or other suitable substrate (substrate 38).

At step 70, deposition equipment 56 may be used to deposit polymer ferrite layer 52 and optional protective polymer layer 60 on substrate 38 over traces 32. In forming ferrite layer 52 on traces 32 and substrate 38, no adhesive need be used, because the ferrite material that forms ferrite layer 52 can be deposited directly on traces 32 and substrate 38. Vias 42 may be formed before and/or after formation of layer 52, if desired.

At step 72, components 64 may be mounted to antenna structures 28 using equipment 62 (e.g., using solder 66).

At step 74, antenna structures 28 may be mounted in housing 12 of device 10 (e.g., using adhesive 30 of FIG. 3).

Figure 7:
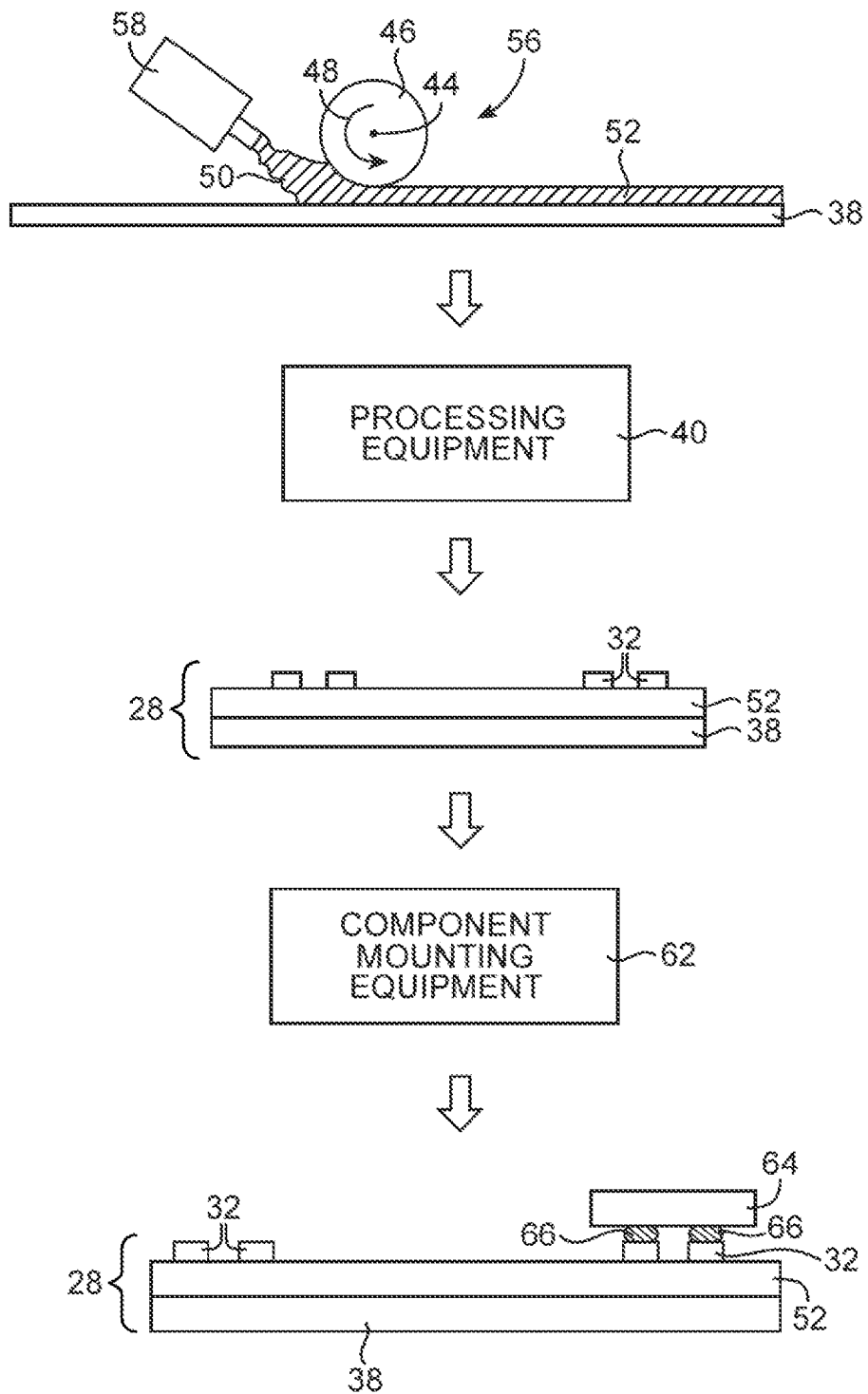
FIG. 7 is a diagram showing how antenna and ferrite structures may be formed by depositing polymer ferrite material on a substrate and subsequently forming antenna traces in accordance with an embodiment of the present invention.

FIG. 7 is a diagram showing how antenna structures such as antenna structures 28 of FIG. 3 may be formed by depositing antenna traces 32 on ferrite material such as polymer ferrite material following formation of a ferrite layer on a substrate.

Initially, ferrite deposition equipment 56 such as dispenser 58 and roller 46 may deposit ferrite layer 52 on substrate 38. Substrate 38 may be a flexible sheet of polymer. Ferrite layer 52 may be a polymer ferrite layer. Layer 52 may be formed directly on substrate 38 using equipment 56 of FIG. 6 or other suitable deposition equipment.

After forming layer 52, processing equipment 40 may deposit patterned antenna traces 32 on layer 52 to form antenna structures 28.

Following formation of antenna structures 28, component mounting equipment 62 may be used to attach one or more components 64 to antenna structures 32. Component mounting equipment 62 may, for example, use solder 66 to attach one or more components 64 to antenna feed terminals formed from traces 32 such as terminals 36 of FIG. 4.

Figure 8:
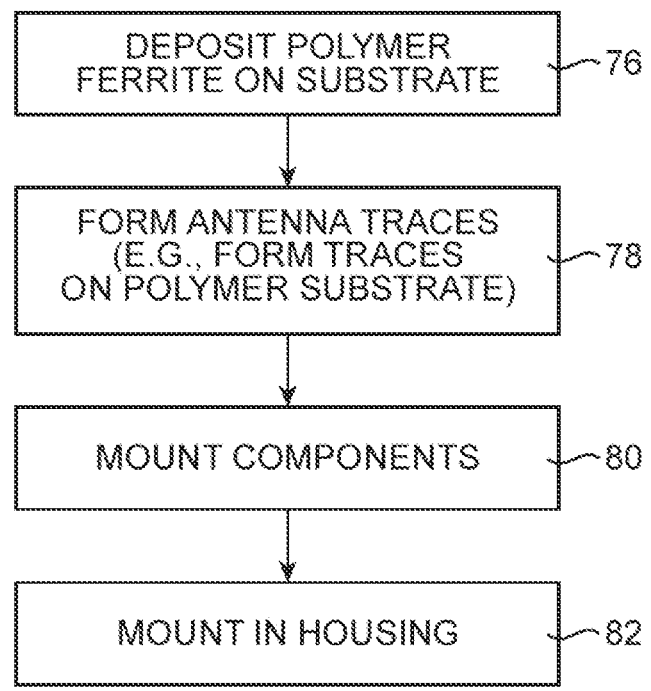
FIG. 8 is a flow chart of illustrative steps involved in forming antenna and ferrite structures of the type shown in FIG. 7 in accordance with an embodiment of the present invention.

Illustrative steps involved in forming antenna structures 28 using an approach of the type shown in FIG. 7 are shown in FIG. 8.

At step 76, ferrite deposition equipment such as equipment 56 of FIG. 7 may be used to deposit ferrite layer 52 on substrate 38. Ferrite layer 52 may be, for example, a polymer ferrite layer. Substrate 38 may be a layer of polyimide, a PET layer, or other polymer film.

At step 78, following formation of ferrite layer 52, equipment 40 may be used to form patterned antenna traces 32 on ferrite layer 52 (e.g., traces 32 may be deposited directly on layer 52) to form antenna structures 28.

After forming antenna structures 28, component mounting equipment 62 may be used to mount one or more components 64 to antenna structures 28 (step 80).

At step 82, antenna structures 28 may be mounted in housing 12 of device 10 (e.g., using adhesive 30 of FIG. 3).

Figure 9:
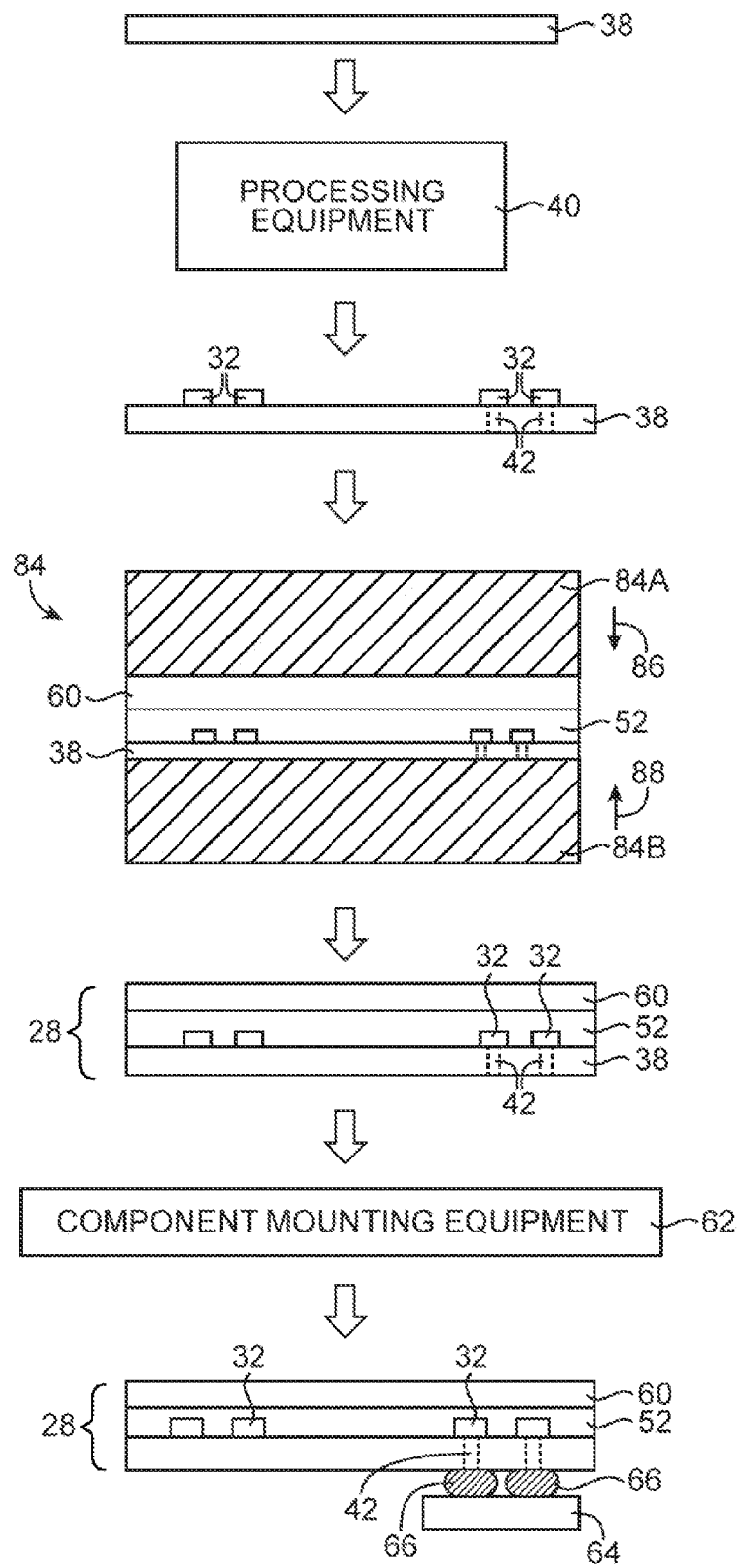
FIG. 9 is a diagram showing how antenna and ferrite structures may be formed using ceramic ferrite material in accordance with an embodiment of the present invention.

FIG. 9 is a diagram showing how antenna structures such as antenna structures 28 of FIG. 3 may be formed by depositing material such as ceramic ferrite material on a substrate.

Initially, processing equipment 40 may be used to form patterned antenna traces 32 on substrate 38. Substrate 38 may be a flexible sheet of polymer. Processing equipment 40 may include equipment for depositing and patterning metal traces 32 directly on substrate 38. If desired, equipment 40 may include etching equipment or other equipment for forming vias such as vias 42. Vias 42 may be used in forming backside contacts to traces 32 (e.g., to form backside contacts for antenna feed terminals in traces 32 such as antenna feed terminals 36 of FIG. 4).

Following the formation of patterned antenna traces 32 on substrate 38, ceramic ferrite deposition equipment 84 may be used to deposit ceramic ferrite layer 52 on substrate 38 covering patterned antenna traces 32. Equipment 84 may be a heated press that is heated to a temperature of about 50-200° C. or other suitable temperatures such as temperatures below 100° C. or above 100° C. For example, equipment 84 may have an upper press portion such as portion 84A that presses downwards in direction 86 and a lower press portion such as portion 84B that presses upwards in direction 88.

To help protect ceramic ferrite layer 52 during subsequent handling, a protective layer such as polymer film 60 may be pressed onto the top of ceramic ferrite layer 52 during operation of press 84. Vias 42 may be formed in layer 38 following formation of ceramic ferrite layer 52 (e.g., if vias 42 were not formed previously).

Following formation of antenna structures 28 by depositing ceramic ferrite layer 52 using equipment such as equipment 84 of FIG. 9 or other suitable ceramic ferrite deposition equipment, component mounting equipment 62 may be used to mount one or more components such as component 64 to antenna structures 28. Equipment 64 may, as an example, use solder 66 to solder components 64 to backside contacts formed from vias 42, thereby coupling components 64 to antenna traces 32 (e.g., antenna terminals 36).

Figure 10:
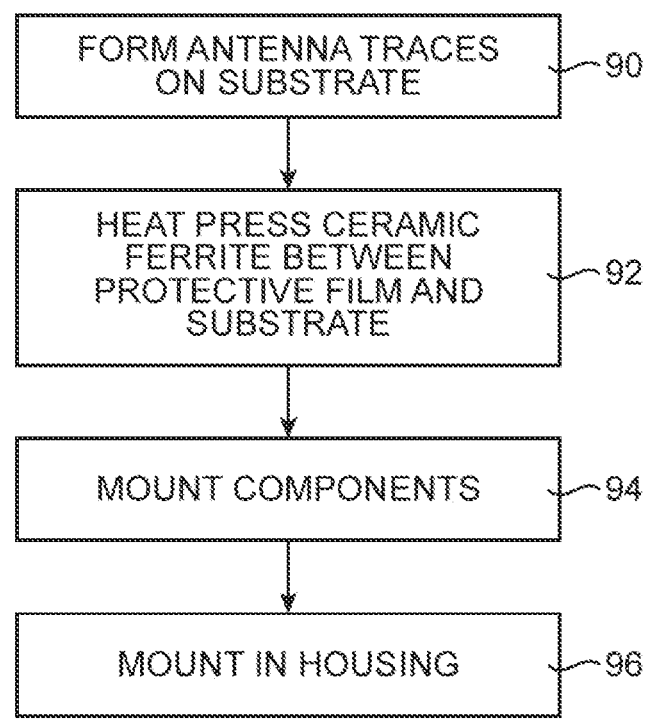
FIG. 10 is a flow chart of illustrative steps involved in forming antenna and ferrite structures of the type shown in FIG. 9 in accordance with an embodiment of the present invention.

Illustrative steps involved in forming antenna structures 28 using an approach of the type shown in FIG. 9 are shown in FIG. 10.

At step 90, processing equipment 40 may be used to form patterned antenna traces 32 on a polymer film or other suitable substrate (e.g., traces 32 may be deposited directly on substrate 38).

At step 92, deposition equipment 84 may be used to deposit ceramic ferrite layer 52 and optional protective polymer layer 60 on substrate 38 over traces 32, thereby forming antenna structures 28. No adhesive layer need be used to form layer 52 on substrate 38, because layer 52 may be deposited directly on substrate 38 and traces 32. Vias 42 may be formed before and/or after formation of layer 52.

At step 94, components 64 may be mounted to antenna structures 28 using equipment 62 (e.g., using solder 66).

At step 96, antenna structures 28 may be mounted in housing 12 of device 10 (e.g., using adhesive 30 of FIG. 3).

Figure 11:
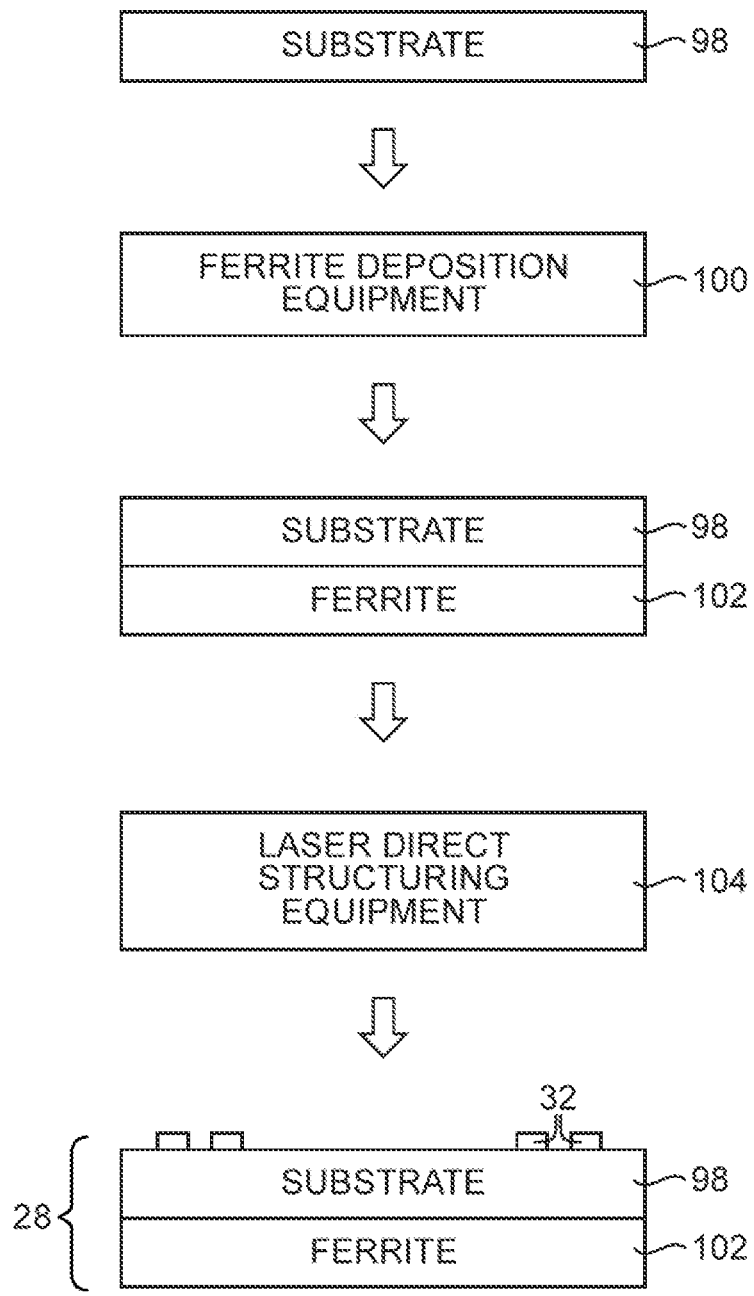
FIG. 11 is a diagram showing how antenna and ferrite structures may be formed by using laser direct structuring techniques to pattern antenna traces on a substrate having a ferrite layer in accordance with an embodiment of the present invention.

FIG. 11 is a diagram showing how antenna structures such as antenna structures 28 of FIG. 3 may be formed by depositing ferrite material on a substrate that is subsequently processed using laser direct structuring equipment to form antenna traces 32.

Initially, ferrite deposition equipment 100 may be used to deposit ferrite layer 102 on substrate 98. Ferrite layer 102 may be a polymer ferrite layer or a ceramic ferrite layer and may have an optional protective polymer coating layer. Substrate 98 may be plastic with a metal complex additive suitable for processing using laser direct structuring (LDS) equipment such as equipment 104.

During operation of equipment 104, light (e.g., laser light) may be directed onto selective areas on the surface of substrate 38 to activate the surface of substrate 38 in a desired pattern. During subsequent metallization using equipment 104, metal traces such as metal antenna traces 32 of FIG. 11 may be grown over the activated regions of substrate 98 to form antenna structures 28. As shown in FIG. 11, substrate 98 may have opposing upper and lower surfaces. Ferrite layer 102 may be formed on the lower surface and antenna traces 32 may be formed on the upper surface.

Figure 12:
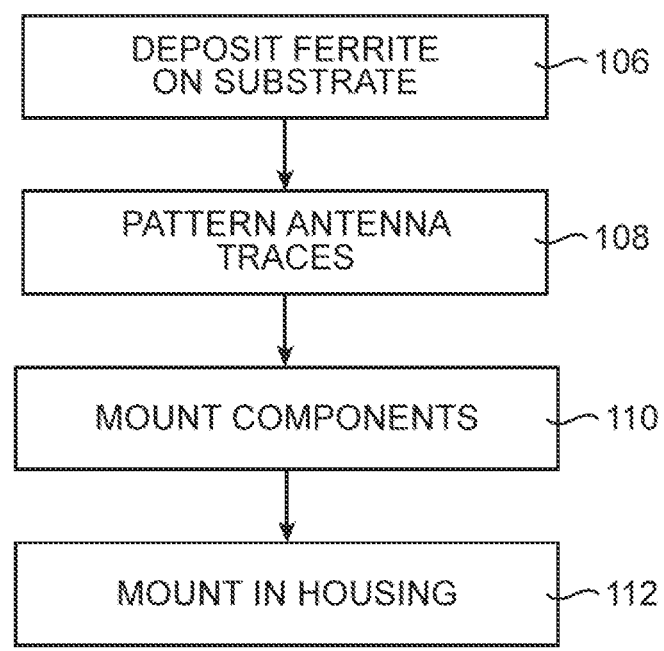
FIG. 12 is a flow chart of illustrative steps involved in forming antenna and ferrite structures of the type shown in FIG. 11 by using laser direct structuring techniques to pattern antenna traces on a substrate having a ferrite layer in accordance with an embodiment of the present invention.

FIG. 12 is a flow chart of illustrative steps involved in forming antenna structures 28 using an approach of the type shown in FIG. 11.

At step 106, ferrite deposition equipment such as equipment 100 of FIG. 11 may be used to deposit ferrite layer 102 on substrate 98. Ferrite layer 102 may be, for example, a polymer ferrite layer or a ceramic ferrite layer that is deposited directly on substrate 98. An optional coating such as a layer of polymer may be formed on top of layer 102 to help protect the ferrite material in layer 102 from damage during assembly operations. Substrate 98 may be a plastic carrier or sheet of polymer suitable for patterning using laser direct structuring equipment 104.

At step 108, following formation of ferrite layer 52, equipment 104 may be used to form patterned antenna traces 32 on substrate 98 (e.g., by depositing traces 32 directly on substrate 98).

After forming antenna structures 28 in this way, component mounting equipment 62 may be used to mount one or more components 64 to antenna structures 28 (step 110).

At step 102, antenna structures 28 may be mounted in housing 12 of device 10 (e.g., using adhesive 30 of FIG. 3).

With the approach of FIGS. 11 and 12, ferrite layer 102 was deposited on substrate 98 before substrate 98 was processed using laser direct structuring equipment 104. If desired, substrate 98 may be processed using laser direct structuring equipment 104 before ferrite layer 102 is deposited. This type of arrangement is shown in FIG. 13.

Figure 13:
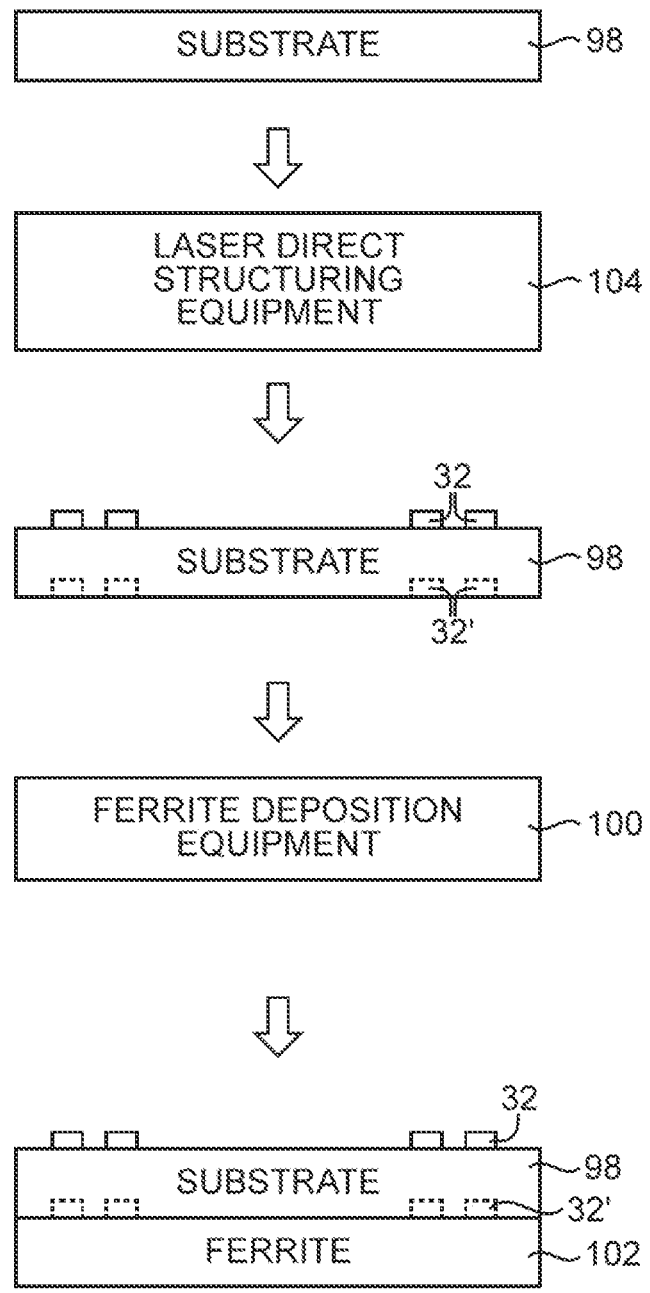
FIG. 13 is a diagram showing how antenna and ferrite structures may be formed by depositing ferrite material on a substrate with patterned antenna traces formed by laser direct structuring in accordance with an embodiment of the present invention.

As shown in FIG. 13, laser direct structuring equipment 104 may be used to process substrate 98 to form antenna traces 32. Antenna traces 32 may be formed directly on the upper surface of substrate 98 or may, as indicated by traces 32' of FIG. 13, be formed directly on the lower surface of substrate 98.

Following formation of antenna traces 32 or 32', ferrite deposition equipment 100 may be used to deposit ferrite layer 102 on substrate 98 (e.g., by directly forming layer 102 on the surface of substrate 98). In configurations in which antenna traces 32 have been formed on the upper surface of substrate 98, traces 32 will remain uncovered following formation of ferrite layer 102 on the opposing lower surface of substrate 98. In configurations in which antenna traces 32' have been formed on the lower surface of substrate 98, ferrite layer 102 will cover antenna traces 32' because ferrite layer 102 and antenna traces 32' will both reside on the lower surface on substrate 98. An advantage to forming traces 32 on the upper surface of substrate 98 is that this type of configuration may help provide dielectric separation between traces 32 and layer 102, which may help to improve antenna performance. An advantage to forming traces 32' on the lower surface of substrate 98 is that this may help to enclose traces 32' in protective layers, thereby reducing the opportunity for damage due to moisture exposure (e.g., in situations in which adhesive layer 30 of FIG. 3 is thin or is not used).

Figure 14:
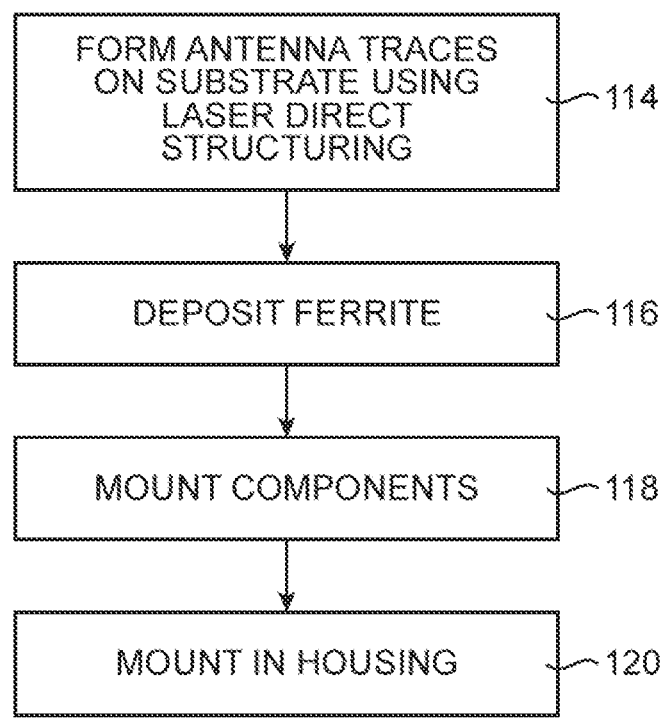
FIG. 14 is a flow chart of illustrative steps involved in forming antenna and ferrite structures of the type shown in FIG. 13 by depositing ferrite material on pattern antenna traces formed by laser direct structuring in accordance with an embodiment of the present invention.

FIG. 14 is a flow chart of illustrative steps involved in forming antenna structures 28 using an approach of the type shown in FIG. 13.

At step 114, laser direct structuring equipment such as equipment 104 of FIG. 13 may be used to form antenna traces such as traces 32 or 32' on substrate 98.

At step 116, ferrite deposition equipment such as equipment 100 of FIG. 13 may be used to deposit ferrite layer 102 on substrate 98.

After forming antenna structures 28 in this way, component mounting equipment 62 may be used to mount one or more components 64 to antenna structures 28 (step 118).

At step 120, antenna structures 28 may be mounted in housing 12 of device 10 (e.g., using adhesive 30 of FIG. 3).

Figure 15:
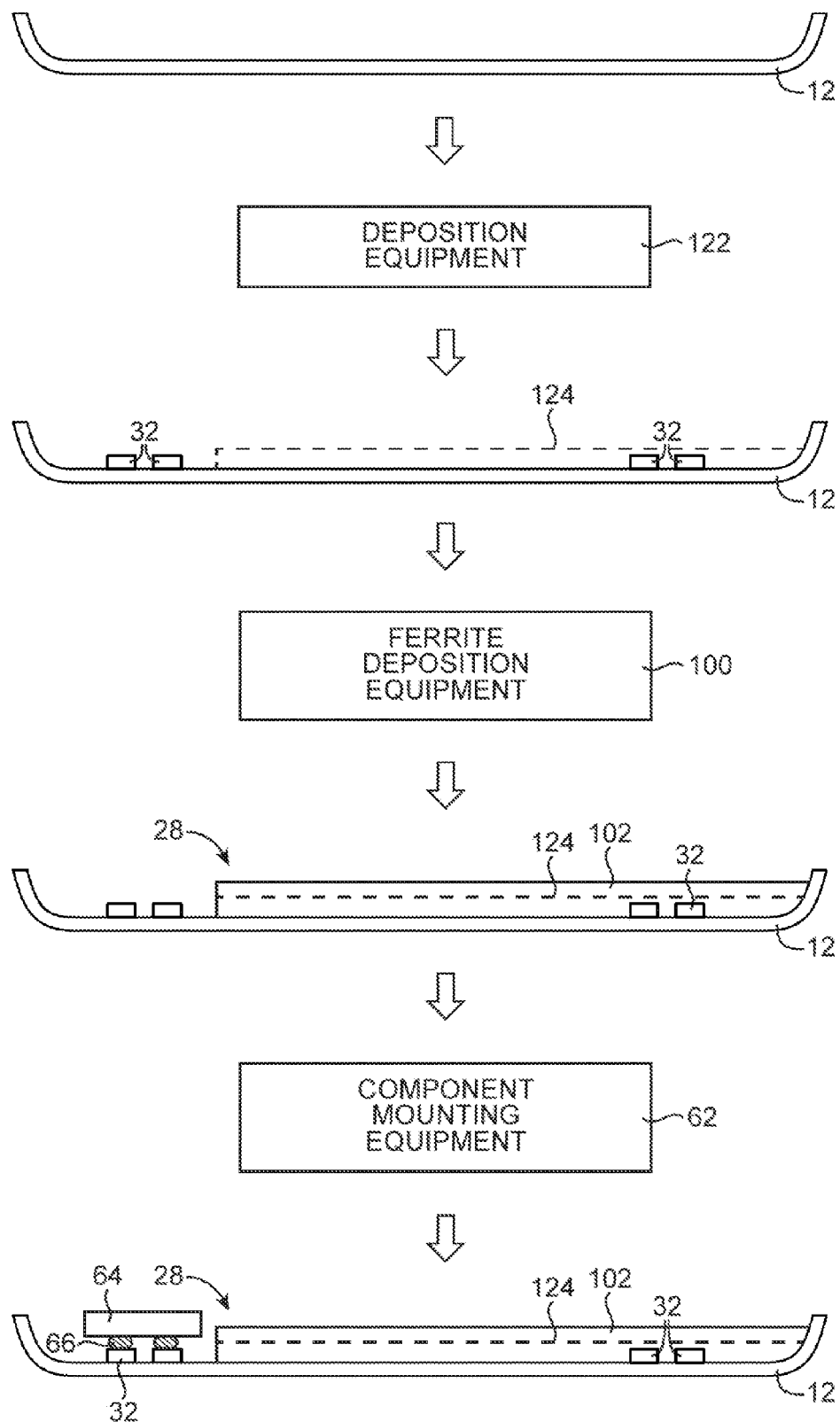
FIG. 15 is a diagram showing how antenna and ferrite structures may be formed by depositing antenna traces and ferrite material on an electronic device housing in accordance with an embodiment of the present invention.

If desired, antenna structures 28 may be formed directly on a housing structure in device 10. As shown in FIG. 15, for example, equipment 122 may be used to form patterned antenna traces 32 directly on the inner surface of housing 12 (or on dielectric structure that is mounted in housing 12). Equipment 122 may be laser direct structuring equipment such as equipment 104 of FIGS. 11 and 13, processing equipment 40 such as processing equipment 40 of FIGS. 5, 7, and 9, or other suitable equipment for forming patterned metal antenna traces 32 on housing 12.

Following formation of traces 32, an optional layer of dielectric material may be formed on traces 32 such as layer 124. Layer 124 may be deposited by deposition equipment 122 (e.g., using spraying, screen printing, ink-jet printing, etc.). If desired, layers such as layer 124 may also be deposited on top of traces 32 in the previously described arrangements for antenna structures 28.

After traces 32 and, if desired, optional layer 124 have been formed, ferrite deposition equipment 100 may be used to deposit ferrite layer 102 over traces 32 and layer 124 to form antenna structures 28. Ferrite layer 102 may be a polymer ferrite layer, a ceramic ferrite layer, or other suitable layer including ferrite material. Layer 102 may be formed directly on housing 12 and traces 32 or, if layer 124 is present, layer 102 may be formed directly on layer 124.

When forming layers such as dielectric layer 124 and ferrite layer 102, it may be desirable to leave portions of antenna traces 32 uncovered. This allows component mounting equipment 62 to attach one or more components 64 to antenna traces 32 using solder 66. If desired, vias or other openings may be formed in layers such as layers 102 and 124 (e.g., using mechanical machining equipment, by removing a temporary protective film, using etching, or using other material removal techniques).

Figure 16:
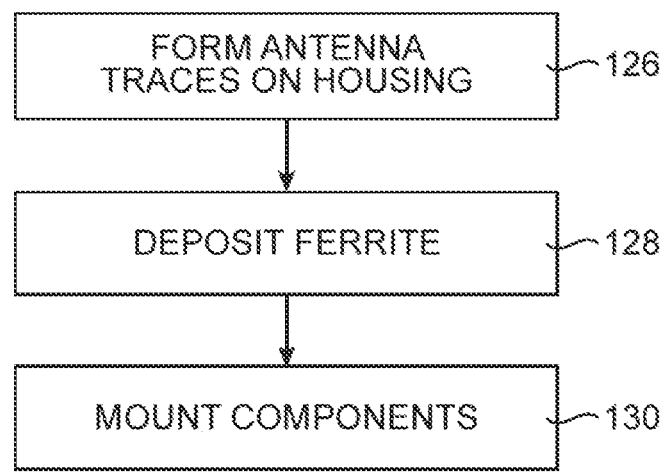
FIG. 16 is a flow chart of illustrative steps involved in forming antenna and ferrite structures on an electronic device housing of the type shown in FIG. 15 in accordance with an embodiment of the present invention.

FIG. 16 is a flow chart of illustrative steps involved in forming antenna structures such as antenna structures 28 of FIG. 15.

At step 126, deposition equipment 122 may be used to deposit patterned metal traces 32 and optional dielectric layer 124 on a substrate such as housing 12.

At step 128, ferrite deposition equipment such as equipment 100 of FIG. 15 may be used to deposit ferrite layer 102 on traces 32 and housing 12 (or on traces 32 and layer 124 if layer 124 is present). Portions of traces 32 may be left uncovered by layers 124 and 102 or portions of layers 124 and 102 may be subsequently removed to form contacts for antenna terminals 36 in traces 34.

After forming antenna structures 28 in this way, component mounting equipment 62 may be used to mount one or more components 64 to antenna structures 28 (step 130).

Figure 17:
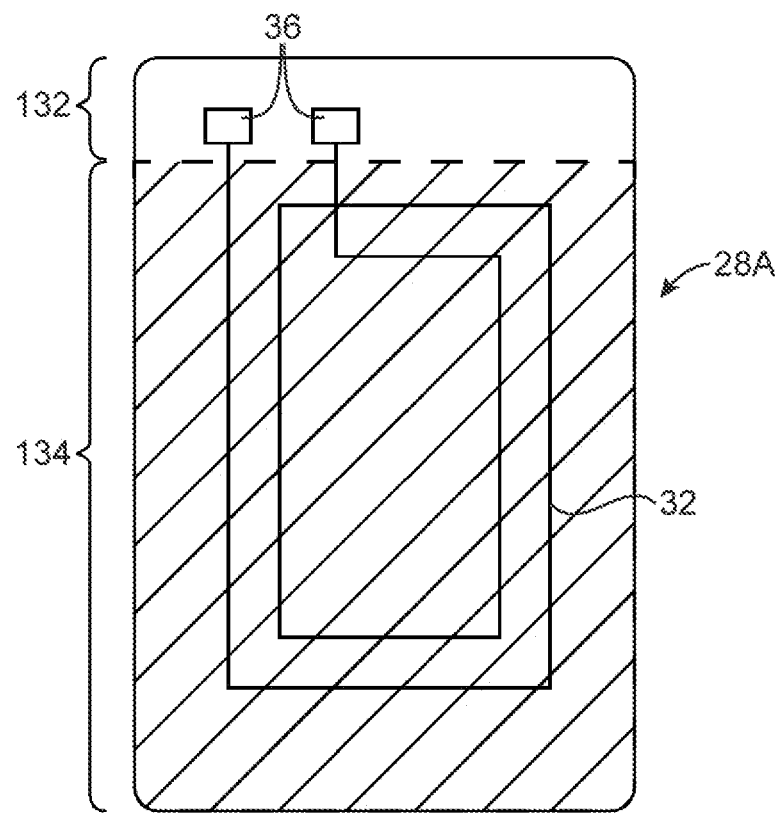
FIG. 17 is a top view of antenna and ferrite structures showing how a ferrite layer may be selectively formed over part a pattern of antenna traces so that antenna terminals in the antenna traces are accessible for forming electrical contacts in accordance with an embodiment of the present invention.

FIG. 17 is a top view of illustrative antenna structures 28A showing how ferrite material may cover over only part of antenna traces 32. Region 134 may, for example, be covered with one or more layers of material such as a layer of ferrite material and, if desired, a layer of polymer or other dielectric that is interposed between the ferrite layer and traces 32. Region 132 (in the example of FIG. 17) may be left uncovered by ferrite material during the process of covering region 134 with ferrite material. If desired, ferrite material may initially be deposited in region 132. This ferrite material may then be selectively removed from region 132. By ensuring that no ferrite material or dielectric material remains in region 132, solder 66 may be used attaching component 64 to traces 32 (e.g., to terminals 36 of FIG. 4).

Figure 18:
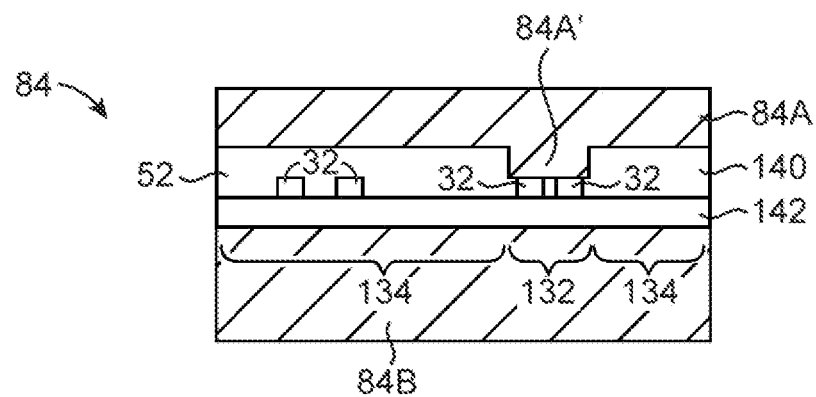
FIG. 18 is a cross-sectional side view of a heated press with a raised region of the type that may be used to form a ceramic ferrite layer on antenna structures in accordance with an embodiment of the present invention.
Figure 19:
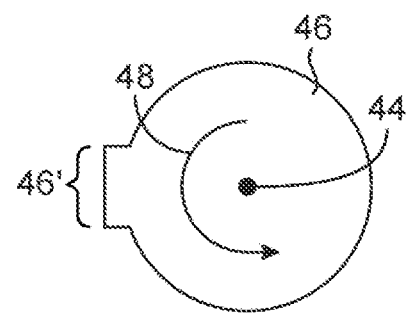
FIG. 19 is a cross-sectional side view of a roller with a raised region for forming patterned polymer ferrite layers in accordance with an embodiment of the present invention.

When using a ferrite deposition tool such as ferrite deposition equipment 56 of FIGS. 5 and 7, ferrite deposition equipment (heat press) 84 of FIG. 9, or ferrite deposition equipment 100 of FIGS. 11 and 13 to deposit ferrite, portions of the deposition tool may be locally raised to prevent ferrite from being deposited in regions such as region 132 of FIG. 17. As shown in FIG. 18, for example, upper press portion 84A may have a raised area such as area 84A' that helps prevents ferrite 140 from being deposited on the upper surfaces of traces 32 on substrate 142 in region 132. As shown in FIG. 19, ferrite deposition roller 46 may likewise have one or more raised features such as raised portion 46' for creating localized regions on antenna structures 28 in which portions of antenna traces 32 are uncovered by ferrite.

Figure 20:
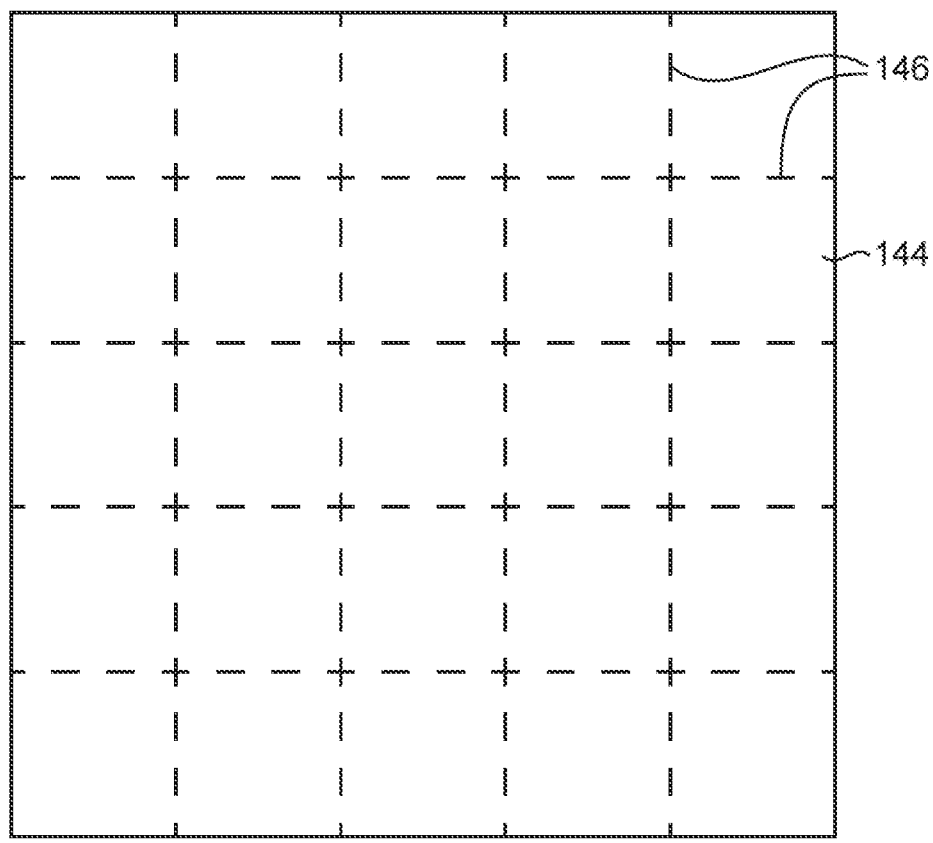
FIG. 20 is a top view of a ceramic ferrite layer with scoring to promote flexibility in accordance with an embodiment of the present invention.

As shown in FIG. 20, ferrite material 144 may, if desired, be provided with grooves (scoring) such as cross-hatched patterned grooves 146. Grooves 146 may provide ferrite material that might otherwise be stiff and prone to fracturing such as rigid ceramic ferrite with an enhanced ability to flex. Enhanced flexibility may be used, for example, to help mount ferrite material 144 in a curved housing and/or may help avoid damage to material 144 during automated and/or manual assembly operations.

The foregoing is merely illustrative of the principles of this invention and various modifications can be made by those skilled in the art without departing from the scope and spirit of the invention.

What is claimed is:

1. An electronic device, comprising:
   a housing;
   antenna structures mounted in the housing, wherein the antenna structures include:
   a layer of polymer having first and second opposing sides and conductive vias extending from the first side to the second side,
   metal antenna traces formed on the first side of the layer of polymer,
   a ferrite layer formed on the first side of the layer of polymer that directly covers the antenna traces, and
   a layer of adhesive located between the layer of polymer and the housing so that the layer of adhesive mounts the layer of polymer directly to the housing;
   a set of electrical contacts at the second side of the layer of polymer that are electrically connected to the conductive vias; and
   an integrated circuit at the second side of the layer of polymer that is electrically connected to the metal antenna traces through the set of electrical contacts and the conductive vias.

2. The electronic device defined in claim 1 wherein the ferrite layer comprises a polymer ferrite layer.

3. The electronic device defined in claim 1 wherein the metal antenna traces are configured to form an inductive loop for a near field communications antenna.

4. The electronic device defined in claim 1 further comprising an additional polymer layer, wherein the additional polymer layer is formed directly over the ferrite layer.

5. The electronic device defined in claim 1 wherein the ferrite layer comprises a ceramic ferrite, wherein the electronic device further comprises an additional polymer layer, and wherein the additional polymer layer is formed on the ceramic ferrite layer.

6. An electronic device having a length, a width, and a height, wherein the length is greater than the width and the width is greater than the height, comprising:
   a housing for the electronic device;
   a display module formed within the housing;
   a display cover layer formed over the display module, wherein the display cover layer extends across the length and the width of the electronic device and the housing comprises a rear housing portion that opposes the display cover layer; and
   antenna structures mounted in the housing, wherein the antenna structures include:
   a layer of polymer,
   a ferrite layer formed on the layer of polymer, wherein a first side of the ferrite layer is in direct contact with the polymer, and
   metal antenna traces formed on and in direct contact with a second side of the layer of ferrite that opposes the first side, wherein the ferrite layer is interposed between the metal antenna traces and the layer of polymer; and
   a layer of adhesive interposed between the ferrite layer and the housing, wherein the metal antenna traces are interposed between the ferrite layer and the layer of adhesive, and wherein the layer of adhesive is configured to mount the antenna structures directly to the rear housing portion such that the adhesive is in direct contact with the rear housing portion; and
   at least one integrated circuit that is directly connected to the antenna traces using solder, wherein the antenna traces are interposed directly between the solder and the ferrite layer.

7. The electronic device defined in claim 6 wherein the ferrite layer comprises a polymer ferrite layer.

8. The electronic device defined in claim 6 wherein the metal antenna traces are configured to form an inductive loop for a near field communications antenna.

9. The electronic device defined in claim 6, wherein the at least one integrated circuit comprises transceiver circuitry, wherein the at least one integrated circuit is directly connected to the antenna traces at a first location on the antenna traces and at a second location on the antenna traces that is different from the first location using the solder.

10. The electronic device defined in claim 9, wherein the solder is interposed directly between the antenna traces and the at least one integrated circuit.

* * * * *